(12) United States Patent
Ishihira et al.

(10) Patent No.: US 12,547,187 B2
(45) Date of Patent: Feb. 10, 2026

(54) WORK MANAGEMENT SYSTEM

(71) Applicant: YAMABIKO CORPORATION, Tokyo (JP)

(72) Inventors: Haruka Ishihira, Tokyo (JP); Yoichi Fuse, Tokyo (JP); Kazuhiro Kaneko, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 102 days.

(21) Appl. No.: 18/432,319

(22) Filed: Feb. 5, 2024

(65) Prior Publication Data

US 2024/0176364 A1 May 30, 2024

Related U.S. Application Data

(63) Continuation of application No. PCT/JP2021/030770, filed on Aug. 23, 2021.

(51) Int. Cl.
| | |
|---|---|
| *G05D 1/648* | (2024.01) |
| *G05D 1/667* | (2024.01) |
| *G05D 105/10* | (2024.01) |
| *G05D 105/15* | (2024.01) |
| *G05D 107/20* | (2024.01) |

(52) U.S. Cl.
CPC ............. *G05D 1/648* (2024.01); *G05D 1/667* (2024.01); *G05D 2105/10* (2024.01); *G05D 2105/15* (2024.01); *G05D 2107/24* (2024.01)

(58) Field of Classification Search
CPC .... G05D 1/648; G05D 1/667; G05D 2105/10; G05D 2105/15; G05D 2107/24; G05D 1/225; G05D 1/249; G05D 1/6987; G05D 2105/14; G05D 2109/10; A63B 47/02; A63B 69/36
See application file for complete search history.

(56) References Cited

U.S. PATENT DOCUMENTS

| | | | |
|---|---|---|---|
| 2007/0183873 A1* | 8/2007 | Colens ................... | G05D 1/244 414/437 |
| 2008/0189004 A1* | 8/2008 | McMurtry ............. | G05D 1/248 701/25 |

(Continued)

FOREIGN PATENT DOCUMENTS

| | | |
|---|---|---|
| CN | 112642121 A | 4/2021 |
| DE | 102020003118 A1 | 12/2020 |

(Continued)

OTHER PUBLICATIONS

ISR cited in JP Appln. No. JP2021-030770 dated Oct. 25, 2021.

(Continued)

*Primary Examiner* — Thomas Ingram
(74) *Attorney, Agent, or Firm* — BACON&THOMAS.PLLC

(57) ABSTRACT

A work management system includes: a working robot configured to perform work while autonomously traveling on a field; a management facility configured to manage the field and balls; and a management device configured to know a management situation of the balls. A work schedule of the working robot is adjusted depending on a ball management situation known by the management device.

7 Claims, 9 Drawing Sheets

(56) References Cited

U.S. PATENT DOCUMENTS

| | | | |
|---|---|---|---|
| 2010/0250024 A1* | 9/2010 | Macedo Ribeiro | G05D 1/0246 |
| | | | 701/2 |
| 2013/0210556 A1* | 8/2013 | Vilar | A63B 47/025 |
| | | | 473/431 |
| 2020/0298067 A1* | 9/2020 | Refaeli | A63B 47/002 |
| 2020/0406118 A1* | 12/2020 | Buscemi | A63B 71/0622 |
| 2021/0038950 A1* | 2/2021 | Sullivan | G05D 1/0212 |
| 2022/0280842 A1 | 9/2022 | Koshikawa et al. | |
| 2023/0053895 A1 | 2/2023 | Sugi et al. | |

FOREIGN PATENT DOCUMENTS

| | | |
|---|---|---|
| EP | 1211924 B1 | 9/2004 |
| JP | 2004-065346 A | 3/2004 |
| JP | 2008-220935 A | 9/2008 |
| WO | WO2021-034257 A1 | 2/2021 |
| WO | WO2021-157707 A1 | 8/2021 |
| WO | WO2021-157743 A1 | 8/2021 |

OTHER PUBLICATIONS

EESR dated Apr. 9, 2024 cited in corresponding European Appln. No. 21954937.5.

OA cited in corresponding European Patent Appln. No. 21954937.5 dated Feb. 6, 2025.

* cited by examiner

FIG. 2

WORK MANAGEMENT SYSTEM

CROSS-REFERENCE TO RELATED APPLICATIONS

The present application is a continuation application of PCT international application No. PCT/JP2021/030770 filed on Aug. 23, 2021, and the entire contents of which are hereby incorporated by reference.

BACKGROUND

1. Technical Field

The present invention relates to a work management system including working robots.

2. Related Art

Conventionally, there has been known a method for collecting balls dispersed over a work area (field) by operating an automatic ball collecting vehicle. See Japanese Patent Application Laid-Open No. 2008-220935. The entire contents of this disclosure are hereby incorporated by reference. With this conventional art, information relating to the distribution of balls in the work area is determined, and the vehicle is guided around the work area to automatically collect the balls.

Meanwhile, there has been known a lawn mowing device (robot mower) used in a location or a region such as a golf course where there are fallen objects on the ground. See European Patent No. 1211924. The entire contents of this disclosure are hereby incorporated by reference. With the conventional art described in Patent Literature 2, in order to prevent a cutting blade from damaging golf balls, a guard member, referred to as a golf disc, is provided.

SUMMARY

A work management system according to the present invention includes: a working robot configured to perform work while autonomously traveling on a field; a management facility configured to manage the field and balls; and a management device configured to know a management situation of the balls. A work schedule of the working robot is adjusted depending on a ball management situation known by the management device.

BRIEF DESCRIPTION OF THE DRAWINGS

FIG. 2 illustrates the configuration of the work management system according to an embodiment of the invention;

DETAILED DESCRIPTION

Figure 1:
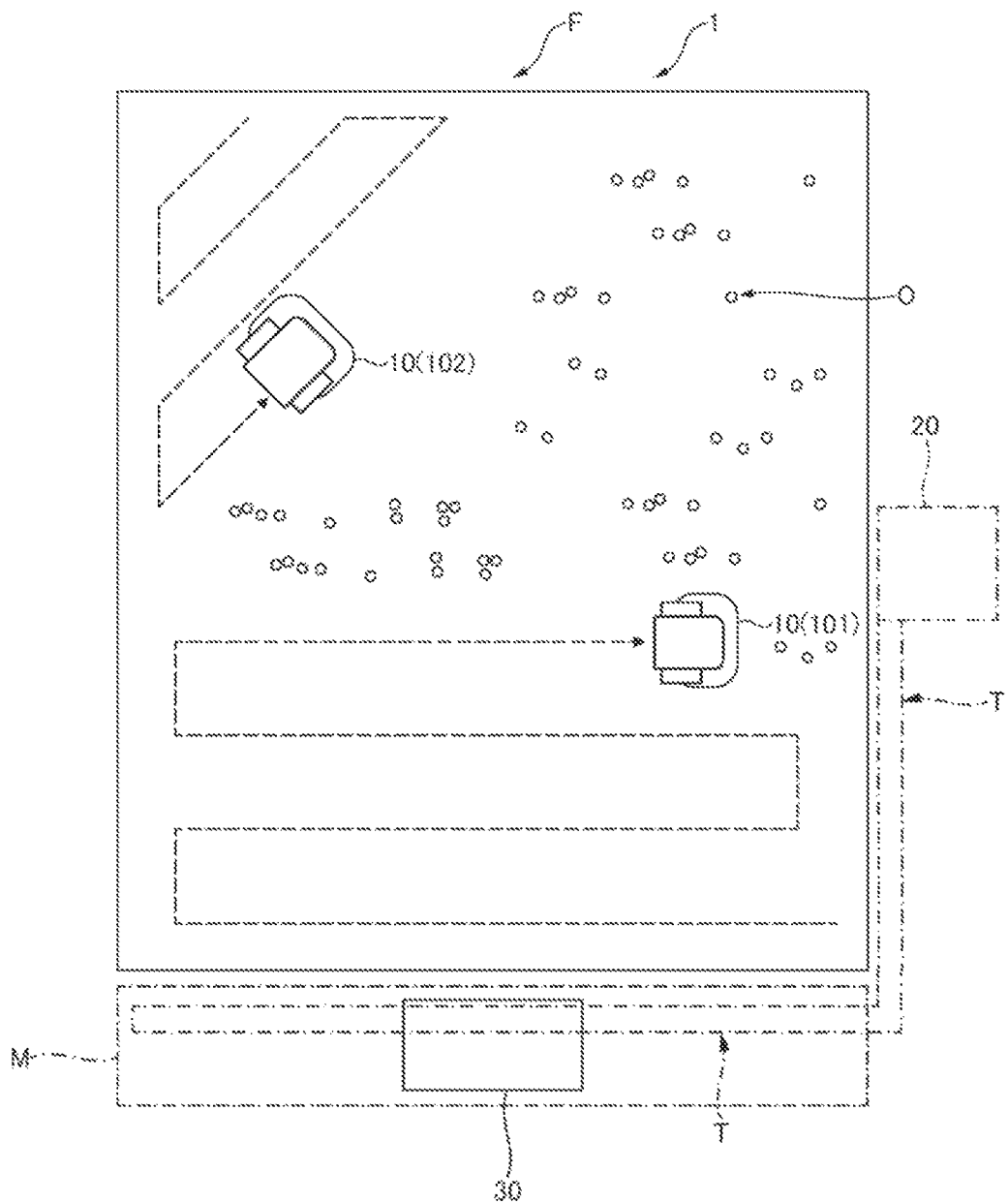
FIG. 1 illustrates an arrangement of a work management system according to an embodiment of the invention.

The conventional art described in Japanese Patent Application Laid-Open No. 2008-220935 makes it possible to preferentially perform collecting work in the location on the field where the density of balls is high. However, with this conventional art, a facility (for example, a golf range) managing the balls does not know how many balls in total are managed, and how many balls among them are used. Therefore, the timing of collecting balls is delayed and consequently there is no available ball, or it is not possible to know the amount of unrecovered balls (lost balls). This may cause a problem with the operation of the facility. In addition, because of excessive collecting work, there is a problem that unnecessary energy is consumed, and the field is damaged by moving the vehicle.

Meanwhile, although the conventional art described in European Patent No. 1211924 makes it possible to mow lawns without damaging balls, when a lot of balls are dispersed on the field, the number of balls to be removed is large, and consequently the work efficiency of the lawn mowing is down. With this conventional art, it is not possible to know the number of balls used in the facility managing the balls, and therefore the work has to be performed regardless of the number of dispersed balls. In particular, when a lot of balls are dispersed on the field, the working efficiency is down, and the load due to the moving vehicle is increased. This causes a problem with the operation of the facility.

The present invention has been achieved to solve the above-described problems. It is therefore an object of the invention to provide a work management system capable of smoothly operating and managing the facility, and efficiently performing the work by working robots.

The work management system according to an embodiment of the invention includes a working robot configured to perform work while autonomously traveling on a field, a management facility configured to manage the field and balls, and a management device configured to know the management situation of the balls.

The work management system may include one working robot or a plurality of working robots. When a plurality of working robots are provided, they may perform the same work, or different kinds of work. One kind of work performed by the working robots on the field is collecting work to collect balls, and the other is mowing work or cleaning work.

The work management system according to an embodiment of the invention adjusts the work schedule of the working robots, depending on the ball management situation known by the management device. When a plurality of working robots perform work on the same field, information such as their locations, traveling routes, working situations, the remaining amounts of batteries, the amounts of power consumption, and charging situations is shared as time-series information, and the work schedule of each of the working robots is adjusted depending on the situation of balls managed by the management facility. Here, the work schedule may be adjusted by the working robot by itself, or the management device.

Hereinafter, an embodiment of the present invention will be described with reference to the drawings. In the description below, the same reference numbers in the different drawings indicate the same functional parts, and therefore repeated description for each of the drawings is omitted.

As illustrated in FIG. 1, a working robot 10 of a work management system 1 performs work to manage a field F. This field F is a work area where the working robot 10 performs the work. When the facility managed by the work management system 1 is a golf range, the field F may be an area in the golf range where golf balls are hit and flown.

The working robot 10 autonomously travels on the field F to perform the management work to manage the field F. Examples of the management work performed by the working robot 10 include work to pick up and collect balls O on the traveling route of the working robot 10, and lawn mowing work or cleaning work performed along the traveling route of the working robot 10.

Although the work management system 1 recognizes the work area of the working robot 10 as a virtual area based on position information, the work area of the working robot 10 may be an area physically partitioned by a wire and markers. In this case, the position information of the area partitioned by the wire and markers is inputted to a management device 30 of the work management system 1.

With the example illustrated in FIG. 1, two working robots 10 (101, 102) are deployed on one field F. As an example, the working robot 101 (10) performs the work to collect balls O (for example, golf balls) dispersed on the field F, and the working robot 102 (10) performs the work to mow grass (lawns) on the field F or to clean the field F.

In FIG. 1, a standby place 20 for the working robot 10 to wait is provided around the field F. As an example, the standby place 20 includes a charging base where a battery of the electric working robot 10 is charged. In addition, the standby place 20 may include a discharge spot where the balls O collected in the body of the working robot 10 (101) are discharged, or may include both the above-described charging base and the discharge spot. With the illustrated example, the standby place 20 is provided outside the field F, but may be provided in the field F. Here, with the illustrated example, the discharge spot provided in the standby place 20 is connected to a transportation channel T for the balls O, and the transportation channel T extends to a management facility M near the field F.

The work management system 1 includes the management facility M configured to manage the field F and the balls O. For example, in a golf range, the management facility M includes a plurality of hitting boxes to hit the balls O to the field F, and a feeder (not illustrated) to feed the balls O recovered in the above-described transportation channel T to each of the hitting boxes. The balls O collected by the working robot 10 (101) are cleaned and dried while moving through the transportation channel T, and then, are fed to each of the hitting boxes by the feeder (not illustrated).

In FIG. 1, the management facility M includes the management device 30 configured to remotely manage the working robots 10 (101, 102) while knowing the management situation of the balls O. The management device 30 knows the management situation based on, for example, at least two of: the total amount of managed balls O; the amount of balls O held by the management facility M; the amount of balls O fed to each of the hitting boxes to use the balls O in the management facility M; the amount of balls dispersed on the field F; and the amount of recovered balls O. By this means, it is possible to control the information of the balls O required to smoothly manage the facility. With the illustrated example, the management device 30 is provided in the management facility M, but alternatively, may be provided in the above-described standby place 20 or other places (for example, on cloud).

By knowing changes in the management situation of the balls O over time, the management device 30 can know the amount of unrecovered balls (lost balls), and therefore can notify the amount of balls O to be refilled so as not to pose a problem with the operation of the management facility M. To know the lost balls is to know a change in the total amount of the managed balls O, and therefore is important for knowing the management situation of the balls O.

Figure 2:
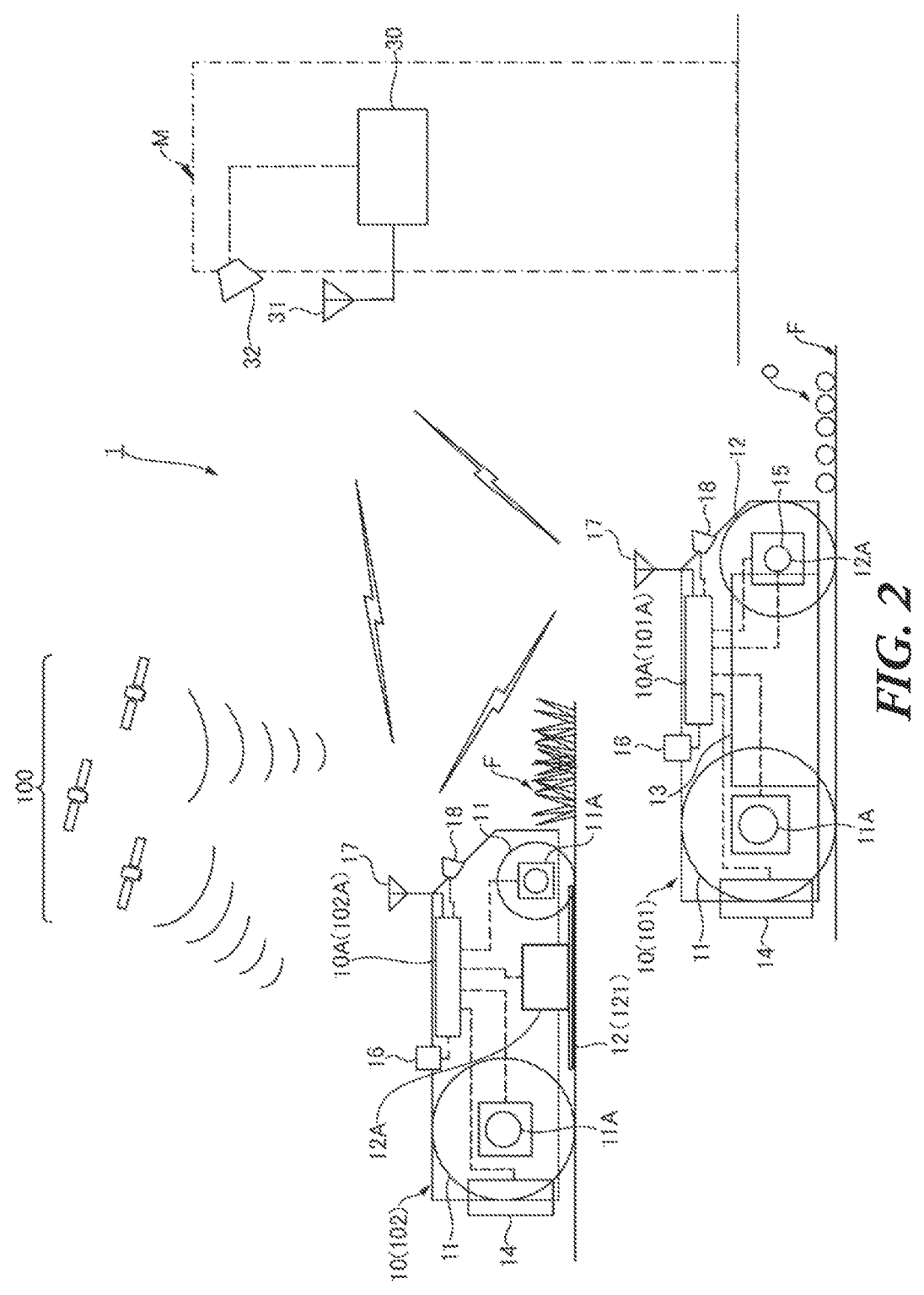
Figure 3:
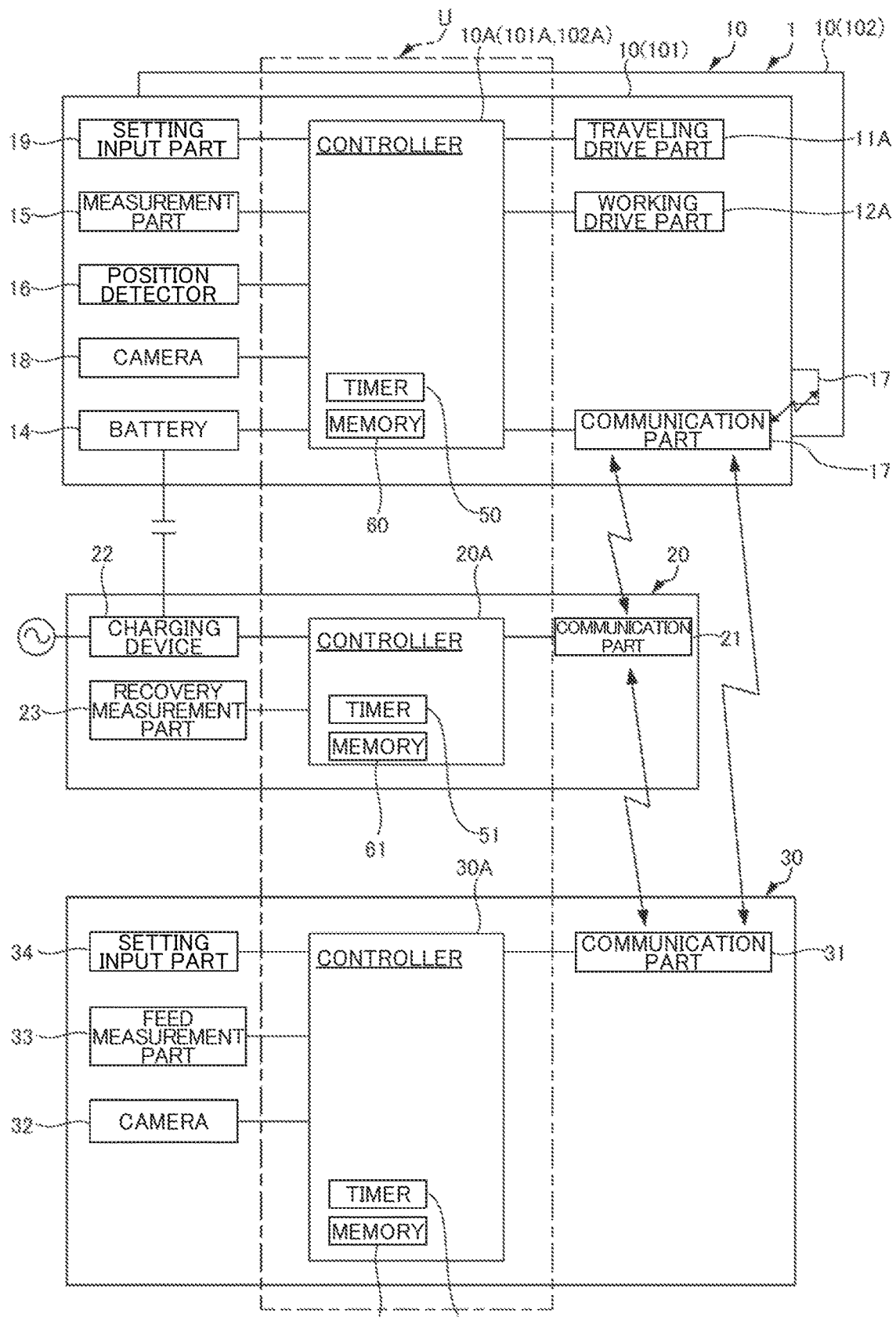
FIG. 3 is a block diagram illustrating the configuration of the work management system according to an embodiment of the invention.

FIG. 2 and FIG. 3 illustrate the system configuration of the work management system 1. One working robot 10 (101) includes: a traveling part 11 having wheels to travel on the field F; a working part (picker) 12 configured to pick up and collect the balls O on the field F; an accommodation part (reservoir) 13 configured to accommodate the balls O collected by the working part 12; a controller 10A (101A) configured to control the operation of a traveling drive part (motor) 11A configured to drive the traveling part 11 and the operation of a working drive part (motor) 12A configured to move the working part 12 up and down; and a battery 14 as a power source of the working robot 10 (101).

The traveling part 11 includes right and left traveling wheels. The working robot 10 can move forward and backward, turn right and left, and steer in any direction, under the control of the traveling drive part 11A that individually drives the wheels.

The working part 12 has a mechanism to pick up the balls O on the field F and put them into the accommodation part 13. One or each of the working part 12 and the accommodation part 13 includes a measurement part 15 configured to measure the amount of the collected balls O. The measurement part 15 may be a counter configured to count the quantity of the balls O picked up by the working part 12, a scale configured to measure the quantity or the weight of the balls O accommodated in the accommodation part 13, or a load meter configured to measure the work load of the working part 12. The information measured by the measurement part 15 is inputted to the controller 10A. Here, a specific example of the controller 10A includes a CPU.

In addition, the working robot 10 includes a position detector 16 for the autonomous travel. As an example of the position detector 16, a GNSS (global navigation satellite system) sensor configured to receive radio signals sent from satellites 100 of a GNSS such as a GPS, or a receiver configured to receive radio waves generated by beacons disposed in or around the field F. Here, a plurality of position detectors 16 may be provided.

To achieve the autonomous travel of the working robot 10, the position detected by the position detector 16 is inputted to the controller 10A, and the controller 10A controls the traveling drive part 11A such that the position of the set traveling route matches the detected position, or the detected position is within the set area.

In order to share information obtained by operating the working robot 10 and information to operate each of the working robots 10, the working robot 10 includes a communication part 17 configured to transmit and receive the information to and from the working robots 10 one another, or other devices. By using the communication part 17, the working robot 10 transmits and receives the information to and from the above-described management device 30, and the other working robot 10 deployed in the field F. The information received by the communication part 17 is inputted to the controller 10A, and the communication part 17 transmits the information outputted from the controller 10A to the communication partner.

In addition, the working robot 10 includes a camera 18 as an imaging device if necessary. The imaging device may be fixedly mounted on the working robot 10, or the imaging device as a separated device may be individually mounted in addition. In the latter case, a smartphone or a video camera may be mounted on the working robot 10. The camera 18 is configured to capture the image of the field F, and the information of the image captured by the camera 18 is inputted to the controller 10A. It is possible to know the dispersion state of the balls O on the field F, and the surface condition of the field F, based on the image captured by the camera 18.

As illustrated, the camera 18 is provided on the working robot 10, and a camera 32 as an imaging device may be provided in the management facility M or a facility around the field F to know the dispersion state of the balls O on the field F, and the surface condition of the field F. Moreover, in order to know the dispersion state of the balls O on the field F, and the surface condition of the field F, a camera may be mounted on a multicopter and so forth flying above the field F. Although the imaging device is provided on the working robot 10 or other devices to obtain the image of the field F, the imaging device may not necessarily be additionally provided. Alternatively, a system or service to obtain aerial photographs transmitted from satellites in real time may be used.

In order to know the dispersion state of the balls O on the field F, a reader/writer using RFID (radio frequency identification) may be adopted, in addition to the cameras 18 and 32 as imaging devices. When RF tags are built in balls O, it is possible to know the dispersion state of the balls O on the field F by transmitting and receiving radio waves or magnetic fields with use of the reader/writer and the RF tags. By this means, in particular, when the balls O are close together on the field F, it is possible to receive the information from the RF tag built in each of the balls O, and therefore to correctly know the number of balls O. Also by this means, it is possible to correctly know the number of balls O even though the balls O are hidden in hollows, ponds, or behind obstacles, because of not depending on the visibility, differently from the captured image.

The other working robot 10 (102) illustrated in FIG. 2 includes the traveling part 11, the working part 12, the traveling drive part (motor) 11A, the working drive part (motor) 12A, the controller 10A (102A), the battery 14, the position detector 16, the communication part 17, and the camera 18 in the same way as the above-described working robot 10 (101). Here, the working part 12 performs lawn mowing work, and cleaning work on the field F. With the illustrated example, the working part 12 is a blade device 121 configured to perform the mowing work, but other components are the same as those of the working robot 10 (101), and therefore repeated description is omitted.

The management device 30 is a computer provided in the management facility M or a server on cloud, and, as illustrated in FIG. 2, includes a communication part 31 configured to transmit and receive information to and from the communication parts 17 of the working robots 10 (101, 102). When the image of the field F is obtained by using a multicopter, the communication part 31 receives the obtained image information. When the camera 32 as an imaging device is provided in the management facility M to capture the image of the field F, the captured image is transmitted to the management device 30 directly or via the communication part 31.

The management situation of the balls O managed by the management device 30 can be known, based on the total amount of managed balls O, the amount of balls O held by the management facility M, the amount of balls O fed to each of the hitting boxes, the amount of recovered balls O, and the amount of unrecovered balls O (lost balls). In addition, the condition of the field F managed by the management device 30, for example, the amount of dispersed balls O, the positions of balls O, and the condition of lawns (grass) can be known, based on the captured image of the field F, and information about the work load of the working robot 10 (102).

As illustrated in FIG. 3, the controllers 10A (101A, 102A) of the working robots 10 (101, 102) transmit and receive information via the communication parts 17, respectively, as described above, and a controller 30A of the management device 30 transmits and receives information via the communication part 31.

In addition, also the standby place 20 includes a controller 20A. The controller 20A transmits and receives information via a communication part 21. A representative example of the controllers 30A and 20A includes a CPU. Here, when the controller 20A of the standby place 20 also serves as a management device 30, the management device 30 may be omitted.

Between the controller 10A (101A, 102A) of the working robot 10 (101, 102) and the controller 30A of the management device 30, the communication part 17 and the communication part 31 are communicably connected to one another. Between the controller 10A of the working robot 10 and the controller 20A of the standby place 20, the communication part 17 and the communication part 21 are communicably connected to one another. Between the controller 20A of the standby place 20 and the controller 30A of the management device 30, the communication part 21 and the communication part 31 are communicably connected to one another. Here, the communication parts 17, 21, and 31 may be communicably connected to each other directly or via the network. Here, the method of connection for communication is not limited, but wireless or wired connection is possible.

The controller 10A (101A) of the working robot 10 (101) receives, as input, for example, work instruction information (the work schedule, the scope of work, and the traveling route) to set the motion of the working robot 10 (101) from a setting input part 19, information about the amount of the collected balls O from the measurement part 15, information about the current position of the working robot 10 (101) from the position detector 16, information about the image of the field F from the camera 18, and information about the remaining amount of the battery from the battery 14.

Then, the controller 10A (101A) controls the traveling drive part 11A and the working drive part 12A based on the inputted information and shared information described later, and causes the working robot 10 (101) to operate according to the inputted information and the shared information. The same applies to the working robot 10 (102), and the controller 10A (102A) controls the traveling drive part 11A and the working drive part 12A, and causes the working robot 10 (102) to operate according to the inputted information and the shared information described later.

The controller 20A provided in the standby place 20 receives, as input, charging process information from a charging device 22 configured to charge the battery 14 of the working robot 10 (101, 102). In addition, the controller 20A receives, as input, information about the amount of recovered balls O which have been discharged to the discharge spot of the standby place 20, from a recovery measurement part 23 installed in the standby place 20. The recovery measurement part 23 measures the number and the weight of the balls O discharged from the working robot 10 (101) which has returned to the standby place 20.

The controller 30A of the management device 30 receives, as input, the work instruction information (the work schedule, the scope of work, and the traveling route) to set the motion of the working robot 10 (101, 102), from a setting input part 34. A feed measurement part 33 installed in the management facility M measures the amount of fed balls O held by the management facility M to each of the hitting boxes by a feeder (not illustrated), and the controller 30A of the management device 30 receives, as input, information about the amount of fed balls O. In addition, the controller 30A receives, as input, information of the image of the field F from the camera 32. The controller 30A acquires information about the condition of the field F, for example, the dispersion state of the balls O (the number and the positions of balls O), and the condition of lawn, from the information of the image. Here, the above-described work instruction information may be inputted from the setting input part 19 to the controller 10A of the working robot 10.

Moreover, the information inputted from the setting input part 34 is not limited to the work instruction information of the working robots 10 (101, 102). In order to optimize the motions of the working robots 10 (101, 102), facility information of the management facility M (business hours, and events held for the operation), the total amount of the managed balls O, and combination thereof may be inputted. By this means, it is possible to input the information directly related to the facility operation.

Here, the communication part 31 of the management device 30 (controller 30A) receives information about the amount of collected balls O transmitted from the controller 10A (101A) via the communication part 17 of the working robot 10 (101). In addition, the communication part 31 of the management device 30 (controller 30A) receives information about the amount of recovered balls O which have been discharged to the discharge spot of the standby place 20. Moreover, information about the amount of balls O fed to each of the hitting boxes of the management facility M is inputted from the feed measurement part 33 to the management device 30 (controller 30A). Then, the management device 30 (controller 30A) calculates required other information about balls O, for example, information about the amount of balls O held by the management facility M, based on the obtained information about balls O. In this case, all the information may not necessarily be received and inputted, but when other information can be derived from the existing information, the derived information may be used.

The management device 30 (controller 30A) knows the management situation of the balls O managed by the management facility M, based on the above-described information such as the information about the amount of collected balls O, the information about the amount of recovered balls O, the information about the amount of fed balls O, the information about the amount of held balls O, and the information about the total amount of balls O inputted in advance (these pieces of information are collectively referred to as "ball management information").

In addition, the management device 30 (controller 30A) receives the image information from the cameras 18 of the working robot 10, and the camera 32 of the management facility M. By this means, it is possible to know the management situation of the balls O, based on the number of balls O (the amount of dispersed balls O) and the positions of balls O on the field F which can be recognized from the image information. In particular, by knowing the amount of dispersed balls O of the ball management situation, it is possible to specify the preferential work area and the non-work area of the field F, and adjust the work hours, and consequently to optimize the work contents of the working robot 10.

The controllers 10A (101A, 102A), 20A and 30A include timers 50, 51, and 52 such as RTCs (real-time clocks) configured to measure and output the time, respectively. The timers 50, 51, and 52 are synchronized with each other by using the communication functions of the controllers 10A (101A, 102A), 20A and 30A, and therefore the same time is outputted. In addition, the controllers 10A (101A, 102A), 20A and 30A include memories 60, 61, and 62 configured to store information and programs, respectively.

The controllers 10A (101A, 102A), 20A, and 30A constitute one control unit U which is unified by exchanging the information with each other with use of their communication functions, and by outputting the same time described above, and the functions of the controllers 10A (101A, 102A), 20A and 30A can be substituted for each other. By this means, the control performed by the work management system 1 can be taken on by the controllers 10A (101A, 102A), 20A, 30A.

Figure 4:
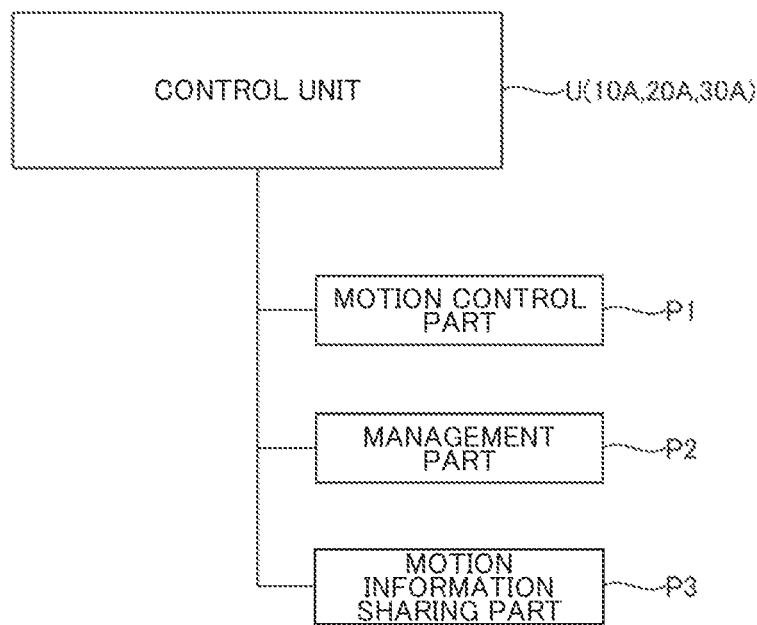
FIG. 4 illustrates the functions (program configuration) of a control unit of the work management system.

As illustrated in FIG. 4, the control of the control unit U (the controllers 10A (101A, 102A), 20A and 30A) of the work management system 1 includes a motion control part P1 to control the autonomous travel of the traveling part 11 (traveling drive part 11A) and control the motion of the working part 12 (working drive part 12A), a management part P2 to manage the motion of each of the working robots 10 (101, 102), and a motion information sharing part P3 to share the motion information between the plurality of working robots 10 (101, 102). The motion control part P1, the management part P2 and the motion information sharing part P3 are programs to operate the control unit U (the controllers 10A, 20A, and 30A) and are installed into the memories 60, 61, and 62.

Here, the management part P2 is a program to manage the motion of each of the working robots 10 (101, 102), and a work schedule created accordingly is stored in the memories 60, 61, and 62. Then, the control of the motion control part P1 is performed based on the work schedule created by the management part P2. By this means, the working robots 10 (101, 102) is operated according to the work schedule to perform various kinds of work.

The management part P2 adjusts the work schedule of the working robots 10 (101, 102), depending on the management situation of the balls O managed by the management device 30 (controller 30A). The work schedule is adjusted depending on the management situation of the balls O, and the work contents of the working robots 10 (101, 102). When the work contents of the working robots 10 (101, 102) are affected by the management situation of the balls O, the work schedule of the working robots 10 (101, 102) can be adjusted to a smoother and more efficient schedule.

Schematically, the work schedule is adjusted by increasing and decreasing the work frequency of the working robots 10 (101, 102) in the work schedule preset by the control unit U, depending on the management situation of the balls O managed by the management device 30 (controller 30A). The work frequency is adjusted to meet the management situation of the balls O, and therefore the working robots 10 (101, 102) can efficiently perform the work without waste.

The increase and decrease in the work frequency is changed depending on the work contents of the working robots 10 (101, 102). That is, the increase and decrease in the work frequency of the working robots 10 (101, 102) is adjusted, based on whether the balls O dispersed on the field F are targeted for the work, or are obstacles. By this means, the efficiency of the field management work is improved.

For the adjustment to decrease the work frequency, in the case of the working robot 10 (101) performing the work to collect balls O (the balls O are targeted for the work), the management part P2 considers a first situation in which a sufficient amount of balls O are held in the management facility M, and a second situation in which at least one of: the amount of balls O fed to each of the hitting boxes by the feeder; the amount of balls dispersed on the field F; and the amount of collected balls O obtained by operating the working robot 10 (101) is smaller than a threshold, and decreases the work frequency in one of or both the first situation and the second situation. Meanwhile, in the case of the working robot 10 (102) performing the mowing work or the cleaning work on the field F (the balls O are obstacles), the management part P2 considers a third situation in which the amount of balls O held in the management facility M is smaller than the threshold, and a fourth situation in which at least one of the amount of fed balls O and the amount of dispersed balls O is greater than the threshold, and decreases the work frequency in one of or both the third situation and the fourth situation.

On the other hand, for the adjustment to increase the work frequency, in the case of the working robot 10 (101) performing the work to collect balls O (the balls O are targeted for the work), the management part P2 considers a fifth situation in which the amount of balls O held in the management facility M is smaller than a criterion, and a sixth situation in which at least one of the amount of fed balls O, the amount of dispersed balls O, and the amount of collected balls O obtained by operating the working robot 10 (101) is greater than the threshold, and increases the work frequency in one of or both the fifth situation and the sixth situation. Meanwhile, in the case of the working robot 10 (102) performing the mowing work or the cleaning work on the field F (the balls O are obstacles), the management part P2 considers a seventh situation in which a sufficient amount of balls O are held in the management facility M, and a eighth situation in which at least one of the amount of fed balls O and the amount of dispersed balls O is smaller than the threshold, and increases the work frequency in one of or both the seventh situation and the eighth situation.

The motion information sharing part P3 is a program to allow sharing of the information obtained by operating the working robots 10 (101, 102) and the information for operating the working robots 10 (101, 102) (the operation schedule, and the work schedule) to control the motions of the working robots (101, 102), and the information is stored in the memories 60, 61, and 62.

The motion information sharing part P3 allows sharing of, for example, the information about the work schedule of the working robots 10 (101, 102) created by the management part P2. To be more specific, the motion information sharing part P3 allows sharing of one or more pieces of the information about the traveling route during the work or the non-work, the work area, the work hours, the state of the work or the charging, the remaining amount of the battery, and the amount of power consumption of each of the working robots 10 (101, 102). The information about the traveling route during the work and the work area is created based on the position information on the field F and the time information.

The motion information sharing part P3 may allow sharing of the information from GNSS (GPS) (timing information and the position information corresponding to the time). In particular, when a GNSS using RTK (real time kinetic) positioning (RTK-GNSS) is adopted, it is possible to improve the precision of the cooperative control of the plurality of working robots 10 performed by the work management system 1. In this case, for example, the same base station is used to detect the positions of the plurality of working robots 10. By this means, it is possible to minimize the inaccuracy using the GNSS, and consequently to cooperate the precise motion control with one another.

In addition, the motion information sharing part P3 allows sharing of the information of the image of the field F captured by the cameras 18 (32) as imaging devices. The image information obtained by capturing the image of the field F by the cameras 18 (32) is shared in combination with the capturing time and the position information of the working robots 10. By this means, it is possible to precisely control the working robots 10 (101, 102), taking into account the situation of the field F.

Figure 5:
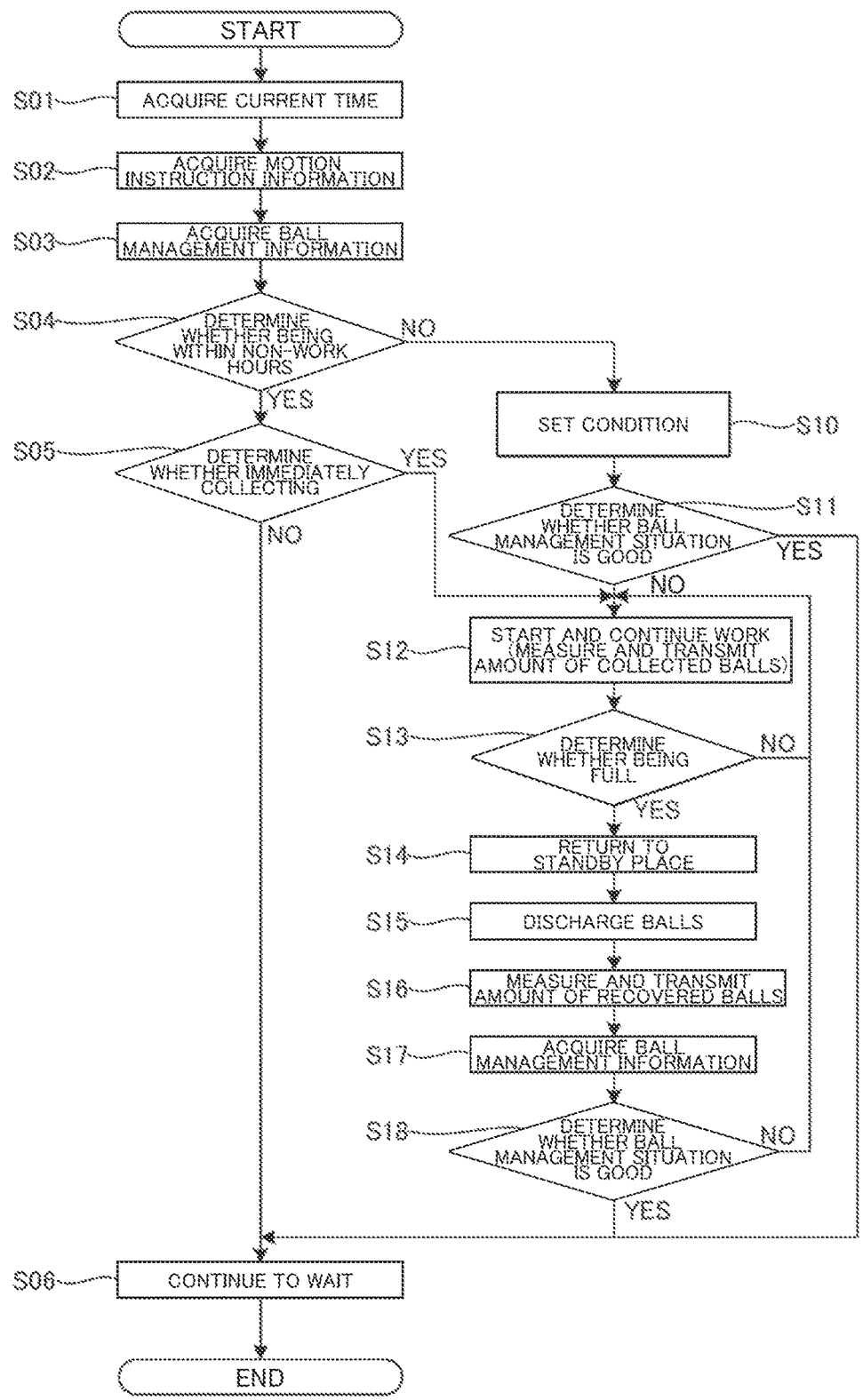
FIG. 5 illustrates an example of the control flow of the control unit to adjust the work schedule of a working robot performing work to collect balls depending on a ball management situation.

FIG. 5 illustrates an example of the control flow of the control unit U to adjust the work schedule of the working robot 10 (101) performing the work to collect balls O, depending on the management situation of the balls O.

The control unit U starts controlling while the working robot 10 (101) waits in the standby place 20. First, the control unit U acquires the current time from the timers 50 (51, 52) (step S01), and acquires the motion instruction information (the work schedule, the scope of work, and the traveling route) inputted by the setting input parts 19 (34) and stored in the memories 60 (61, 62) (step S02).

In addition, the control unit U acquires ball management information for the current time (step S03). Here, the ball management information is the information to determine whether the management situation of the balls O managed by the management facility M is good for the operation of the management facility M. Relative to the total amount of balls O inputted in advance, the information about the amount of recovered balls O measured by the recovery measurement part 23; the information about the amount of balls O fed to the hitting boxes measured by feed measurement part 33; the information about the dispersion state of the balls O on the field F obtained from the image captured by the camera 18 (32); and the information about the amount of held balls O calculated from various kinds of information about the balls O obtained by the controller 30A are comprehensively or individually considered to know the ball management information.

Then, the control unit U collates the current time with the work schedule obtained from the motion instruction information to determine whether the current time is within the non-work hours in the work schedule. When determining that the current time is within the non-work hours (step S04: YES), the control unit U determines whether it is necessary to immediately collect balls O based on the ball management information acquired in the step S03 (step S05), and when determining that it is not necessary (step S05: NO), the control unit U causes the working robot 10 (101) to continue to wait in the standby place 20 (step S06). On the other hand, when determining that it is necessary to immediately collect balls O (step S05: YES), for example, when the amount of balls O held in the management facility M is smaller than the criterion, the step is moved to step S12 described later to start the work by the working robot 10 (101). In this case, the work schedule of the working robot 10 (101) is adjusted to increase the work frequency.

On the other hand, when determining that the current time is not within the non-work hours in the work schedule (step S04: NO), the control unit U sets a condition to determine whether the ball management situation is good (step S10). For this condition setting, in a case where the work frequency of the working robot 10 (101) is required to be increased, the threshold used to determine whether the ball management situation is good is reduced, and, on the other hand, in a case where the work frequency of the working robot 10 is required to be decreased, the threshold used to determine whether the ball management situation is good is increased.

In the condition setting (step S10), the case where the work frequency of the working robot 10 is required to be increased means when the amount of balls O used for the operation of the management facility M is predicted to be increased, for example, a season or a day of the week when an event for the operation is held, and the number of visitors are increased. On the other hand, the case where the work frequency of the working robot 10 (101) is required to be decreased means when the number of balls O used for the operation of the management facility M is predicted to be reduced, or when the field F becomes to be easily damaged by the traveling of the working robot 10 (101) on a rainy day.

Then, the control unit U determines whether the ball management situation is good (step S11), based on the threshold set by the condition setting (step S10). When determining that the ball management situation is good (step S11: YES), that is, when it is no problem for the operation not to recover balls O, to be more specific, when the amount of balls O dispersed on the field F is smaller than the threshold, the control unit U does not cause the working robot 10 (101) to perform the work even when the current time is not within the non-work hours in the existing work schedule, but causes the working robot 10 (101) to continue to wait in the standby place 20 (step S06). By this means, the work schedule of the working robot 10 (101) is adjusted to decrease the work frequency. As a result, it is possible to reduce unnecessary work, and minimize the energy consumption, and the damage of the field F. Here, other examples of the case where it is no problem for the operation not to recover balls O include a case where the amount of fed balls O is smaller than the threshold, and a case where the amount of balls O held by the management facility M is greater than the threshold.

On the other hand, when determining that the ball management situation is not good (step S11: NO), that is, when determining that it is necessary to immediately recover the balls O for the operation, to be more specific, when the amount of balls O dispersed on the field F is greater than the threshold, the control unit U starts the work of the working robot 10 (101) (step S12). The working robot 10 (101) performs the work based on the motion instruction information acquired in the step S02. When working robot 10 (101) starts the work, the amount of balls O collected in the robot body is measured by the measurement part 15 and transmitted to the control unit U. Then, the control unit U determines whether the accommodation part 13 is full (step S13).

Here, other examples of the case where it is necessary to recover the balls O for the operation include a case where the amount of fed balls O is greater than the threshold, and a case where the amount of balls O held by the management facility M is smaller than the threshold.

When determining that the accommodation part 13 is not full (step S13: NO), the control unit U causes the working robot 10 (101) to continue the work (step S12). In this case, the working robot 10 (101) continues the work, based on the motion instruction information acquired in the step S02. Here, whether the accommodation part 13 is full may be determined based on not only the measured value of the measurement part 15, but also the output of a sensor separately provided to detect the full state.

When determining that the accommodation part 13 is full while the work is continued (step S13: YES), the control unit U returns the working robot 10 (101) to the standby place 20 (step S14), and discharges the balls O accumulated in the accommodation part 13 of the working robot 10 (101) to the discharge spot in the standby place 20 (step S15). By this means, the amount of recovered balls measured by the recovery measurement part 23 is transmitted to the control unit U (step S16).

After that, the control unit U considers the amount of recovered balls having been transmitted, acquires the ball management information again (step S17), and determines whether the ball management situation is good (step S18). When determining that the ball management situation is not good (step S18: NO), the control unit U causes the working robot 10 (101) to continue the work (step S12), and, on the other hand, when determining that the ball management situation is good (step S18: YES), the control unit U causes the working robot 10 (101) to continue to wait in the standby place 20 (step S06). By this means, the work schedule of the working robot 10 (101) is adjusted to increase the work frequency. As a result, it is possible to prevent that there is no ball O to be used in the management facility M.

In the control flow illustrated in FIG. 5, the ball management information is acquired before starting the work according to the work schedule. However, as the control flow illustrated in FIG. 6, the ball management information may be acquired after starting the work.

Figure 6:
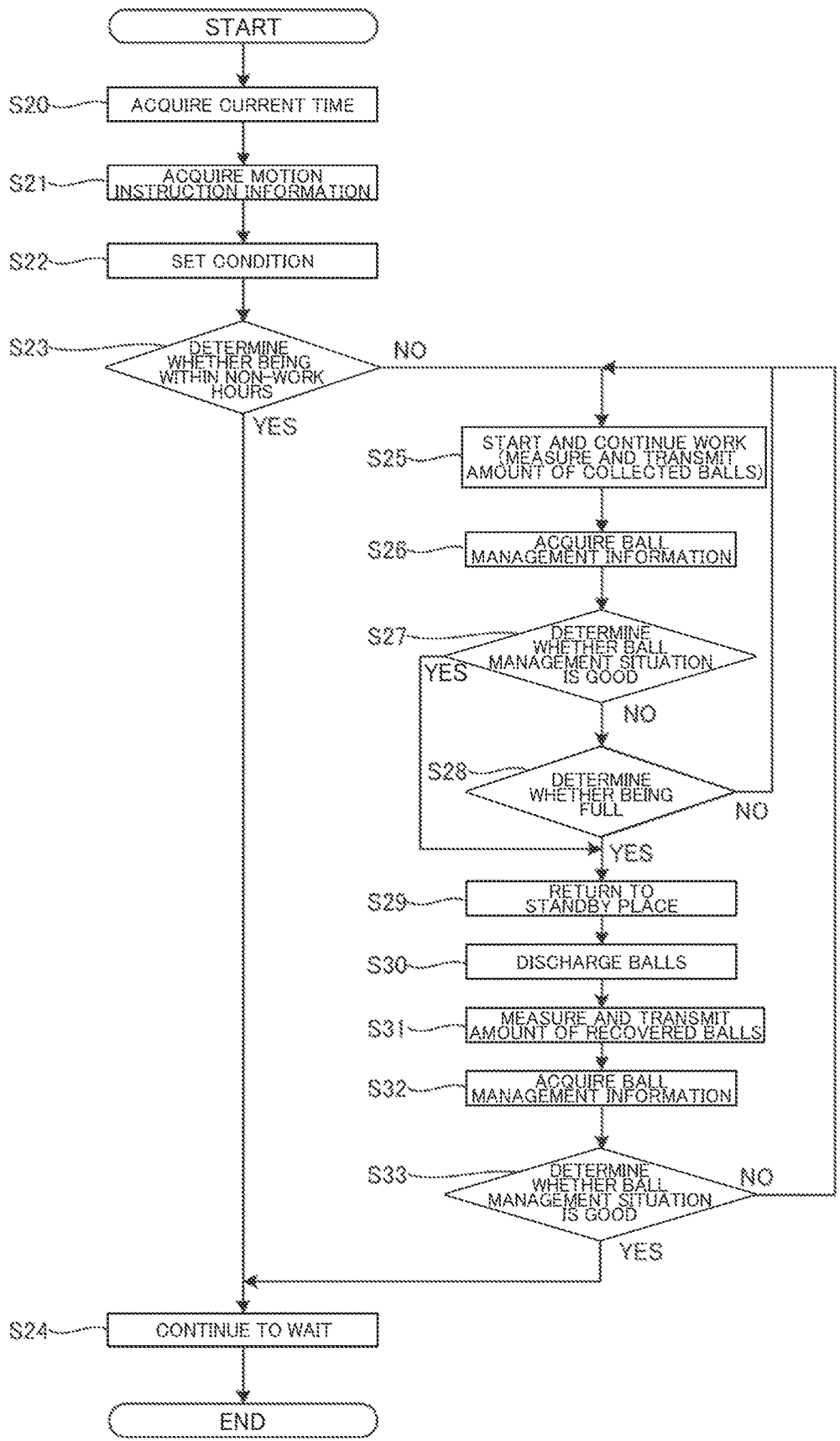
FIG. 6 illustrates another example of the control flow of the control unit to adjust the work schedule of the working robot performing the work to collect balls depending on the ball management situation.

With the example illustrated in FIG. 6, the control unit U starts controlling while the working robot 10 (101) for performing the work to collect balls O waits in the standby place 20, in the same way as the above-described example illustrated in FIG. 5. Then, the control unit U acquires the current time from the timers 50 (51, 52) (step S20), and acquires the motion instruction information (the work schedule, the scope of work, and the traveling route) inputted by the setting input parts 19 (34) and stored in the memories 60 (61, 62) (step S21).

Next, the control unit U sets the condition (step S22) in the same way as the step S10 of the example illustrated in FIG. 5, and then collates the current time with the work schedule obtained from the motion instruction information to determine whether the current time is within the non-work hours on the work schedule (step S23). When determining that the current time is within the non-work hours (step 23: YES), the control unit U causes the working robot 10 (101) to continue to wait in the standby place 20 (step S24).

On the other hand, when determining that the current time is not within the non-work hours in the work schedule (step S23: NO), the control unit U causes the working robot 10 (101) to start the work (step S25). Then, after a predetermined condition (the traveling distance or the work hours) has passed, the control unit U acquires ball management information (step S26). This ball management information includes information about the dispersion state of the balls O on the field F obtained from the image captured by the camera 18 of the working robot 10 (101) performing the work.

After acquiring the ball management information, the control unit U determines whether the ball management situation is good, based on the acquired information (step S27). When determining that the ball management situation is not good (step S27: NO), the control unit U causes the working robot 10 (101) to continue the work until the accommodation part 13 is full (step S28: NO, step S25), and when the accommodation part 13 becomes full (step S28: YES), the control unit U returns the working robot 10 (101) to the discharge spot in the standby place 20 (step S29).

Then, after discharging the balls O in the discharge spot of the standby place 20 (step S30), measuring and transmitting the amount of recovered balls (step S31), the control unit U acquires the ball management information again (step S32), and determines whether the ball management situation is good (step S33). When determining that the ball management situation is still not good (step S33: NO), the control unit U causes the working robot 10 (101) to continue the work (step S25), and when determining that the ball management situation becomes good (step S33: YES), the control unit U causes the working robot 10 (101) to continue to wait in the standby place 20 (step S24).

Figure 7:
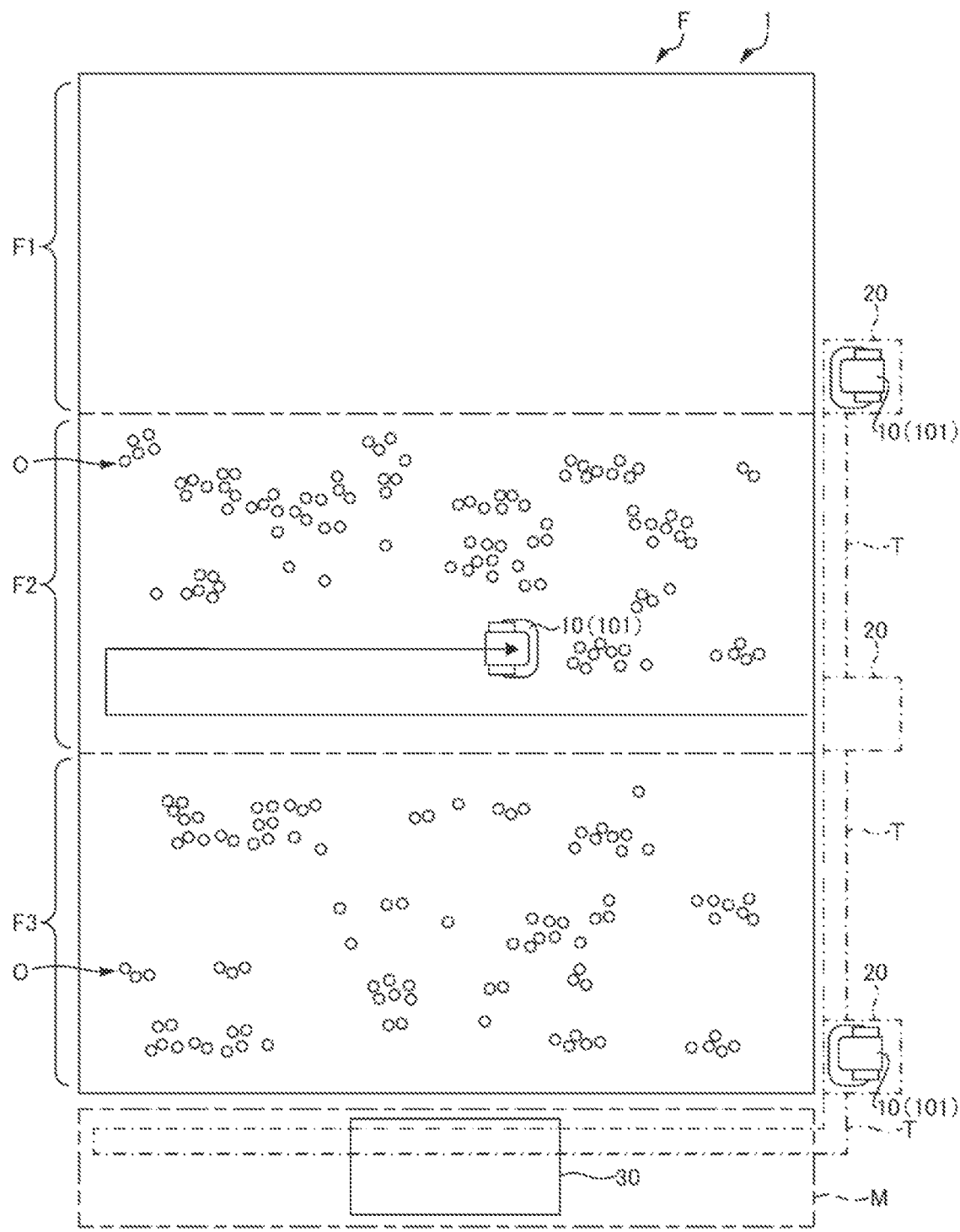
FIG. 7 is a conceptual diagram illustrating an example where the whole facility is divided into a plurality of areas.

Here, as illustrated in FIG. 7, in a case where the field F is divided into a plurality of areas F1, F2 and F3, and the working robots 10 (101) and the standby places 20 are provided for the areas F1 to F3, respectively, even when the overall ball management situation is not good, but there is an area in which no ball O is dispersed (the area F1 as illustrated), the work for the area F1 is not needed. In this case, as the control flow illustrated in FIG. 6, after starting the work by the working robot 10 (101), the control unit U has to acquire the ball management information based on the collected situation of the balls O by the working robot 10 (101) and the dispersion state of the balls O obtained from the image captured by the camera 18 of the working robot 10 (101), and determine whether the ball management situation is good for each of the areas. In this case, it is determined whether the work is needed for each of the areas, rather than it is determined whether the ball management situation is good.

According to this work management system 1, the working robot 10 (101) performing the work to collect the balls O cooperates with the management device 30 of the management facility M to adjust the work schedule of the working robot 10 (101), depending on the ball management situation of the balls O managed by the management facility M.

By this means, when the ball management situation is good, that is, when it is no problem in the recovered situation of the balls O for the operation, it is possible to rest the working robot 10 (101) regardless of the existing work schedule, and therefore to minimize the energy consumption and the damage of the field F due to the work of the working robot 10 (101).

Moreover, in the situation where a lot of balls O are used, it is possible to increase the work frequency of the working robot 10 (101) depending on the ball management situation before there is no ball O to be used in the management facility M. Consequently, it is possible to achieve smooth operation even though the total amount of managed balls O is reduced. By this means, it is possible to reduce the total amount of balls O needed to be replaced due to the deterioration over time as possible, and therefore to reduce the running cost for the operation.

Figure 8:
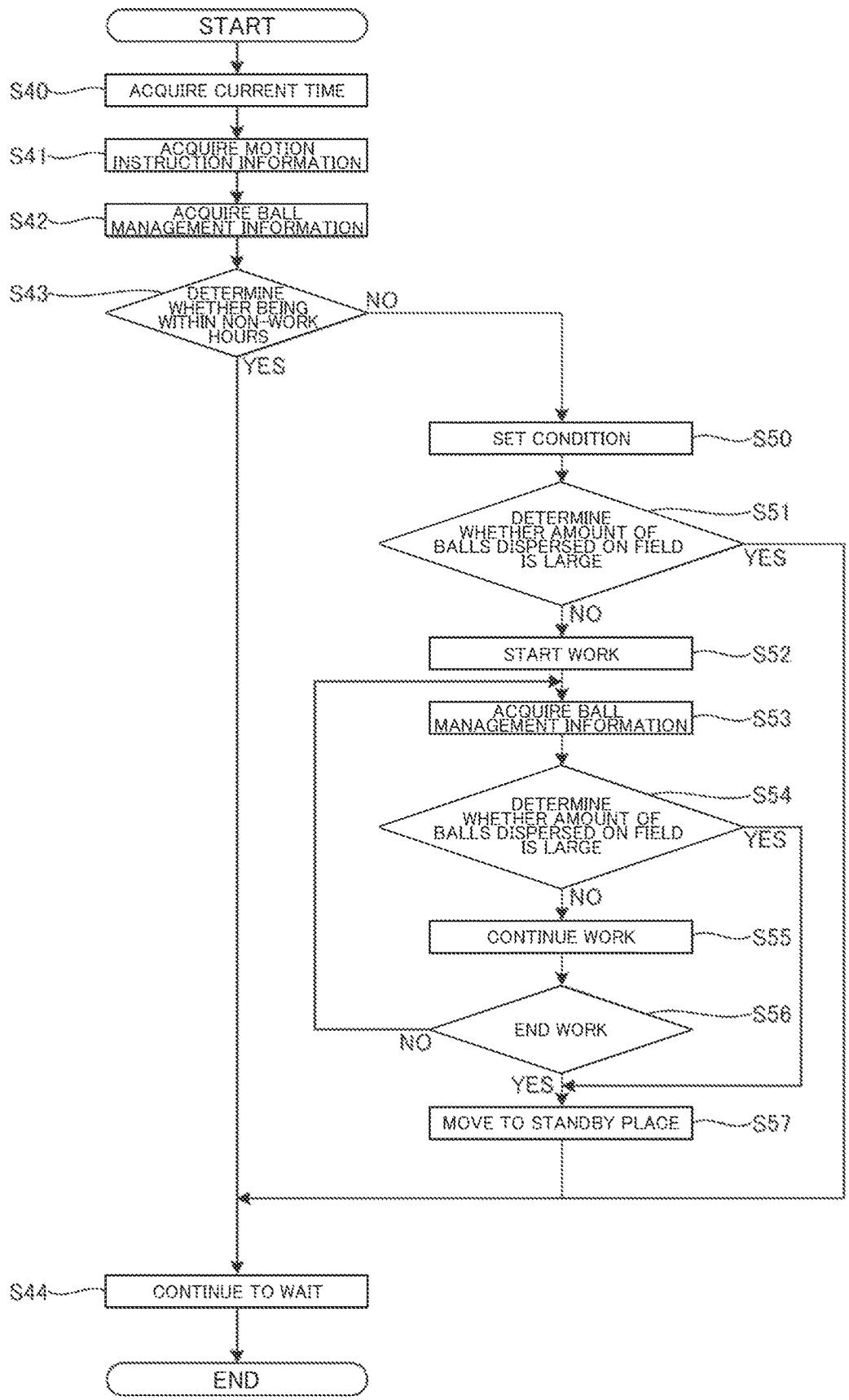
FIG. 8 illustrates an example of the control flow of the control unit to adjust the work schedule of the working robot performing mowing work, depending on a ball management situation.
Figure 9:
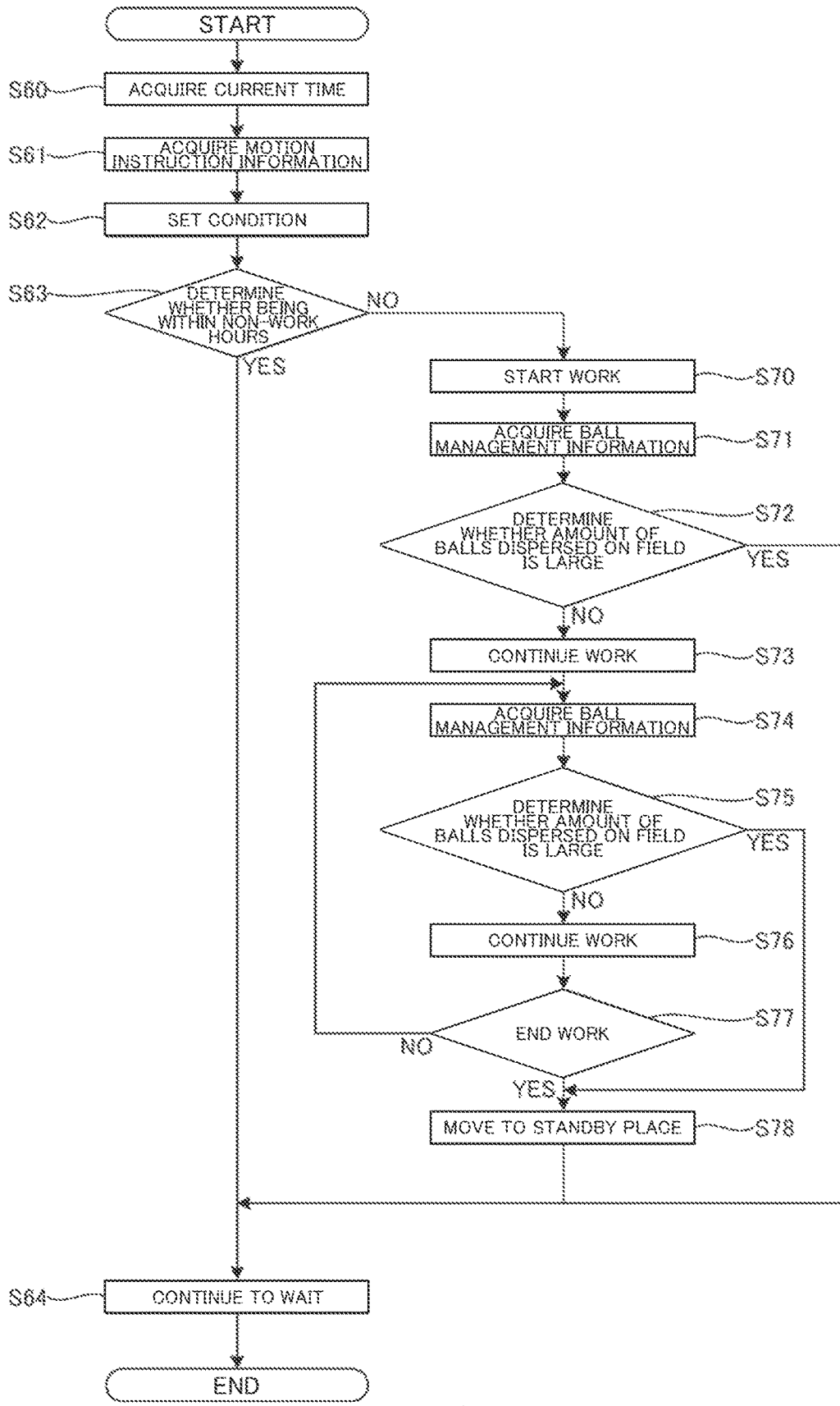
FIG. 9 illustrates another example of the control flow of the control unit to adjust the work schedule of the working robot performing the mowing work, depending on the ball management situation.

Each of FIG. 8 and FIG. 9 illustrates the control flow of the control unit U to adjust the work schedule of the working robot 10 (102) configured to perform the lawn mowing work or the cleaning work on the field F, depending on the management situation of the balls O. The control flow illustrated in FIG. 8 is an example where the ball management information is acquired before the work is started according to the work schedule, and the control flow illustrated in FIG. 9 is an example where the ball management information is acquired after the work is started.

In the control flows illustrated in FIG. 8 and FIG. 9, in the same way as FIG. 5, and FIG. 6, the control unit U starts controlling while the working robot 10 (102) waits in the standby place 20, acquires the current time from the timers 50 (51, 52) (step S40, step S60), and acquires the motion instruction information (the work schedule, the scope of work, and the traveling route) inputted by the setting input parts 19 (34) and stored in the memories 60 (61, 62) (step S41, step S61).

After that, in the control flow illustrated in FIG. 8, in the same way as the control flow illustrated in FIG. 5, the control unit U acquires the ball management information for the current time (step S42) and determines whether the current time is within the non-work hours in the work schedule (step S43). When determining that the current time is within the non-work hours (step S43: YES), the control unit U causes the working robot 10 (102) to continue to wait in the standby place 20 (step S44).

On the other hand, when determining that the current time is not within the non-work hours in the work schedule (step S43: NO), the control unit U sets the condition (step S50) in the same way as the step S10 of FIG. 5. In the condition setting (step S50), the case where the frequency of the work (for example, the lawn mowing work) of the working robot 10 (102) is required to be increased means when the amount of balls O dispersed on the field F is predicted to be reduced, and the case where the work frequency of the working robot 10 (102) is required to be decreased means when the amount of balls O dispersed on the field F is predicted to be increased.

Then, depending on the management situation of the balls O, when determining that the amount of balls O dispersed on the field F is large (step S51: YES), the control unit U causes the working robot 10 (102) to continue to wait in the standby place 20 (step S44) and, on the other hand, when determining that the amount of balls O dispersed on the field F is small (step S51: NO), the control unit U starts the work (step S52).

After starting the work, the control unit U acquires the ball management information at any timing (step S53). Depending on the management situation of the balls O, when determining that the amount of balls O dispersed on the field F is large (step S54: YES), the control unit U causes the working robot 10 (102) to move to the standby place 20 (step S57), and to continue to wait (step S44), and, on the other hand, when determining that the amount of balls O dispersed on the field F is small (step S54: NO), the control unit U continues the work (step S55). Then, when not determining to end the work (step S56: NO), the control unit U continues the work and repeats the steps S53 to S55, and when determining to end the work (step S56: YES), the control unit U causes the working robot 10 (102) to move to the standby place 20 (step S57) and to continue to wait (step S44).

Meanwhile, in the control flow illustrated in FIG. 9, after acquiring the motion instruction information (step S62), the control unit U sets the condition (step S62) and determines whether the current time is within the non-work hours in the work schedule (step S63). When determining that the current time is within the non-work hours (step S63: YES), the control unit U causes the working robot 10 (102) to continue to wait in the standby place 20 (step S64), and, on the other hand, when determining that the current time is not within the non-work hours (step S63: NO), the control unit U starts the work (step S70).

Then, after starting the work, the control unit U acquires the ball management information (step S71), and then, in the subsequent steps (step S72 to step S78), the control unit U causes the working robot 10 (102) to continue the work or to move to the standby place 20 depending on the management situation of the balls O, in the same way as the step S51 to step S57 of the example illustrated in FIG. 8.

With the above-described control flows, the cases where the working robots 10 performs the work to collect the balls O or the mowing work have been described. However, when one working robot 10 (101) performing the work to collect the balls O, and another working robot 10 (102) performing the different work such as the lawn mowing work are used together in one field F, the motions of the plurality of working robots 10 (101, 102) can cooperate with one another by the function of the motion information sharing part P3 described above.

By this means, one working robot 10 can perform the field management work such as the mowing work in the area in which another working robot has performed the work to collect the balls O. Moreover, one working robot 10 (102) can perform the field management work such as the mowing work in the area in which the amount of dispersed balls O is small and therefore another working robot 10 (101) for collecting the balls O is absent. In this way, the working robots 10 performing the different kinds of work cooperate with one another, and therefore it is possible to avoid the risk of damaging the balls O by the blade of the working robot 10 (102) performing the mowing work.

According to the work management system having the above-described features, the work schedule of the working robots is adjusted depending on the ball management situation, and therefore it is possible to smoothly operate the management facility with a small amount of balls, and also to efficiently perform the field management work by the working robot.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A work management system comprising:
 a working robot configured to perform work while autonomously traveling on a field;
 a management facility configured to manage the field and balls; and
 a management device configured to know a management situation of the balls,
 wherein the ball management situation is known based on:
  an amount of the balls held by the management facility, and
  at least one of:
   an amount the balls fed to be used in the management facility,
   an amount of the balls dispersed on the field, or
   an amount of the balls recovered from the dispersed balls, and
  wherein a work schedule of the working robot is adjusted by the management device depending on a ball management situation known by the management device, and
  the working robot performs the work according to the adjusted work schedule.

2. The work management system according to claim 1, wherein the work schedule is adjusted by increasing and decreasing a work frequency of the working robot depending on the ball management situation.

3. The work management system according to claim 1, wherein the amount of dispersed balls is known based on a dispersion state of the balls obtained from an image of the field captured by an imaging device.

4. The work management system according to claim 1, wherein the amount of dispersed balls is known by using radio waves or magnetic fields.

5. The work management system according to claim 1, wherein the working robot includes a working robot configured to perform the work to collect the balls dispersed on the field.

6. The work management system according to claim 1, wherein the working robot is a mowing robot configured to mow grass on the field, or a cleaning robot configured to clean the field.

7. The work management system according to claim 1,
 wherein the work schedule of the working robot is adjusted by increasing and decreasing a work frequency of the working robot,
 wherein the ball management situation is known based on:
  the amount of the balls held by the management facility, and
  the amount of the balls dispersed on the field, and
 wherein the work frequency is decreased when the amount of balls dispersed on the field is smaller than a threshold.

* * * * *